United States Patent
Shen et al.

(10) Patent No.: US 7,699,298 B2
(45) Date of Patent: Apr. 20, 2010

(54) JIG FOR HOLDING A CORE AND METHOD UTILIZING THE SAME

(75) Inventors: Hung-Tsan Shen, Tu-Cheng (TW); Bi-Hui Hu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/488,466

(22) Filed: Jun. 19, 2009

(65) Prior Publication Data

US 2009/0324190 A1 Dec. 31, 2009

(30) Foreign Application Priority Data

Jun. 25, 2008 (CN) .................. 2008 1 0302315

(51) Int. Cl.
*B23Q 1/26* (2006.01)

(52) U.S. Cl. ............... 269/47; 269/50; 269/289 R; 269/302.1; 269/309

(58) Field of Classification Search .......... 269/47, 269/50, 289 R, 302.1, 291, 309–310, 266, 269/24–27, 32
See application file for complete search history.

(56) References Cited

U.S. PATENT DOCUMENTS

| 4,193,588 | A | * | 3/1980 | Doneaux ............... 269/47 |
| 4,989,846 | A | * | 2/1991 | Quinn ............... 269/54.5 |
| 5,107,599 | A | * | 4/1992 | Marincic et al. ........... 33/573 |
| 5,516,089 | A | * | 5/1996 | Seniff et al. ............... 269/304 |
| 6,668,695 | B2 | * | 12/2003 | Poole et al. ............... 83/466 |
| 6,702,272 | B2 | * | 3/2004 | Monvavage ............... 269/266 |
| 2009/0008848 | A1 | * | 1/2009 | Zhang et al. ............... 269/50 |

* cited by examiner

*Primary Examiner*—Lee D Wilson
(74) *Attorney, Agent, or Firm*—Raymond J. Chew

(57) ABSTRACT

A jig for holding a core which comprises a movable platform, a base positioned on the movable platform which has a receiving hole, and an inserter positioned inside the receiving hole of the base, shaped corresponding to the shape of the receiving hole, to fasten the core to the inserter. The inserter comprises a core receiving hole, a plurality of positioning recesses disposed symmetrically in the periphery of the core receiving hole, a plurality of positioning blocks received in the positioning recesses, and a plurality of resilient elements received in a space between the positioning recesses and the positioning blocks to hold the core firmly.

14 Claims, 4 Drawing Sheets

JIG FOR HOLDING A CORE AND METHOD UTILIZING THE SAME

BACKGROUND

1. Technical Field

The present application relates to a jig for holding a core, and a method for aligning the center of a core using the jig.

2. Description of Related Art

Generally, lens molding requires processing the surface of a core with a laser carving machine to improve quality of the lens. When the laser carving machine processes the surface of a core, a very small etched area should be formed on the surface. Because the etched area is very small, the center of the core should align with the processing head of the laser carving machine to process the surface of the core precisely. Aligning the center of the core requires regulation of the position of the core relative to the position of the laser carving machine. However, such regulation requires employment of a holding jig to release and clip the core repeatedly until the deviation between the center of the core and the processing head of the laser carving machine is substantially eliminated. The process of releasing and clipping is inconvenient and reduces production efficiency. Therefore, an efficient aligning device and method for processing the core are desirable.

DETAILED DESCRIPTION

Figure 1:
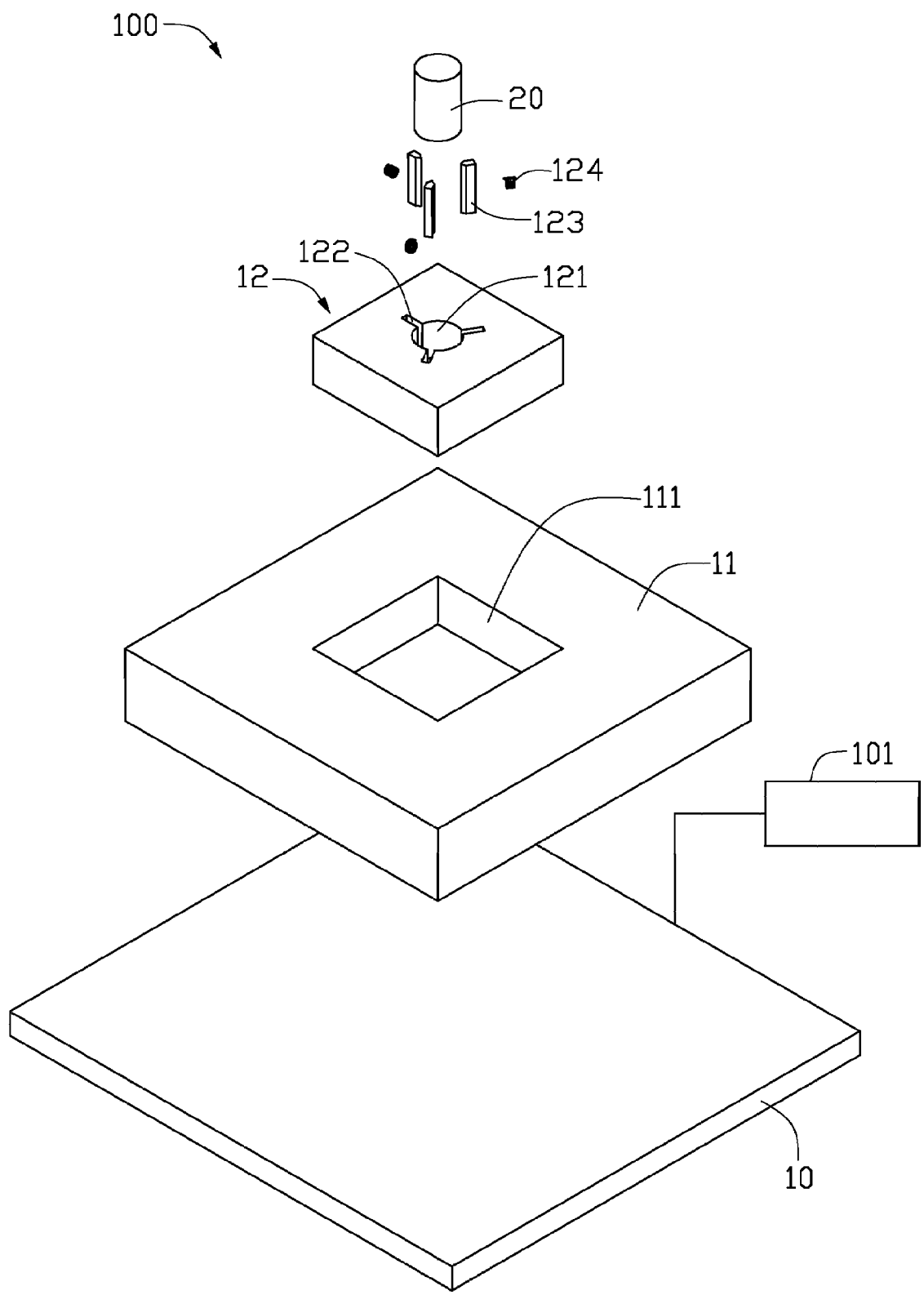
FIG. 1 is an exploded drawing of a jig holding a core as disclosed.
Figure 2:
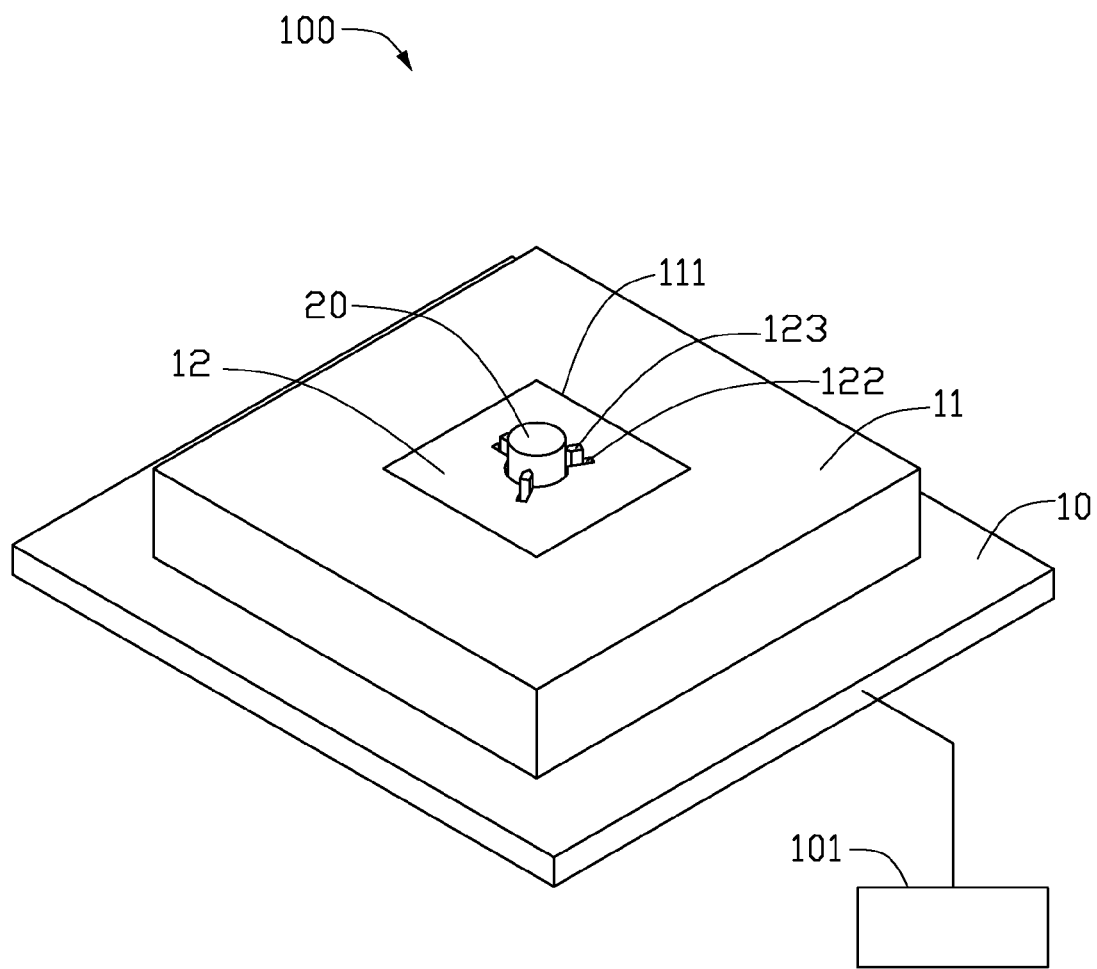
FIG. 2 shows the elements of FIG. 1 in an assembled state.

FIGS. 1 and 2 show a jig 100 for holding a core 20. The jig 100 comprises a movable platform 10, a base 11 comprising a containing hole 111, and an inserter 12 received therein, which holds the core 20 for processing. The movable platform 10 is connected to an electrical driver 101, configured for moving the platform 10 in horizontal and vertical directions to align the platform 10 with a laser carving machine.

The base 11 is provided on the movable platform 10. The containing hole 111 can be shaped as a triangle, a rectangle, or a polygon depending on the embodiment. In one embodiment of the present application, the containing hole 111 is shown as a rectangle, and it is understandable that the shape is not a limitation to the present application.

The inserter 12 is shaped so as to accommodate the shape of the containing hole 111, to ensure that when the inserter 12 is inside the containing hole 111, the inserter 12 cannot be easily movable. In the embodiment shown in FIG. 1 and FIG. 2, the inserter 12 is rectangular. The inserter 12 comprises a core receiving hole 121 configured for receiving the core 20, a plurality of positioning recesses 122 in communication with the core receiving hole 121, a plurality of positioning blocks 123 inserted into the positioning recess 122 configured for positioning the core 20, and a plurality of resilient elements 124 provided in a gap between the positioning recess 122 and the positioning block 123. The core receiving hole 121 is shaped to accommodate to the shape of the core 20 to secure the core 20.

As shown in FIG. 1, three positioning recesses 122 are symmetrically provided in the periphery of the core receiving hole 121. It is understandable that the number of positioning recess 122 are not limited to three, and the numbers are given for facilitating the positioning block 123 secure the core 20.

The contact portion of the positioning block 123 and the core 20 can be tapered to accommodate different core shapes. The positioning block 123 is a rectangle having a tapered cross section. As shown in FIG. 2, a cavity is defined between the positioning block and the positioning recess, and resilient elements 124 are provided inside the cavity to regulate the space and to fasten the core 20 more firmly.

Figure 3:
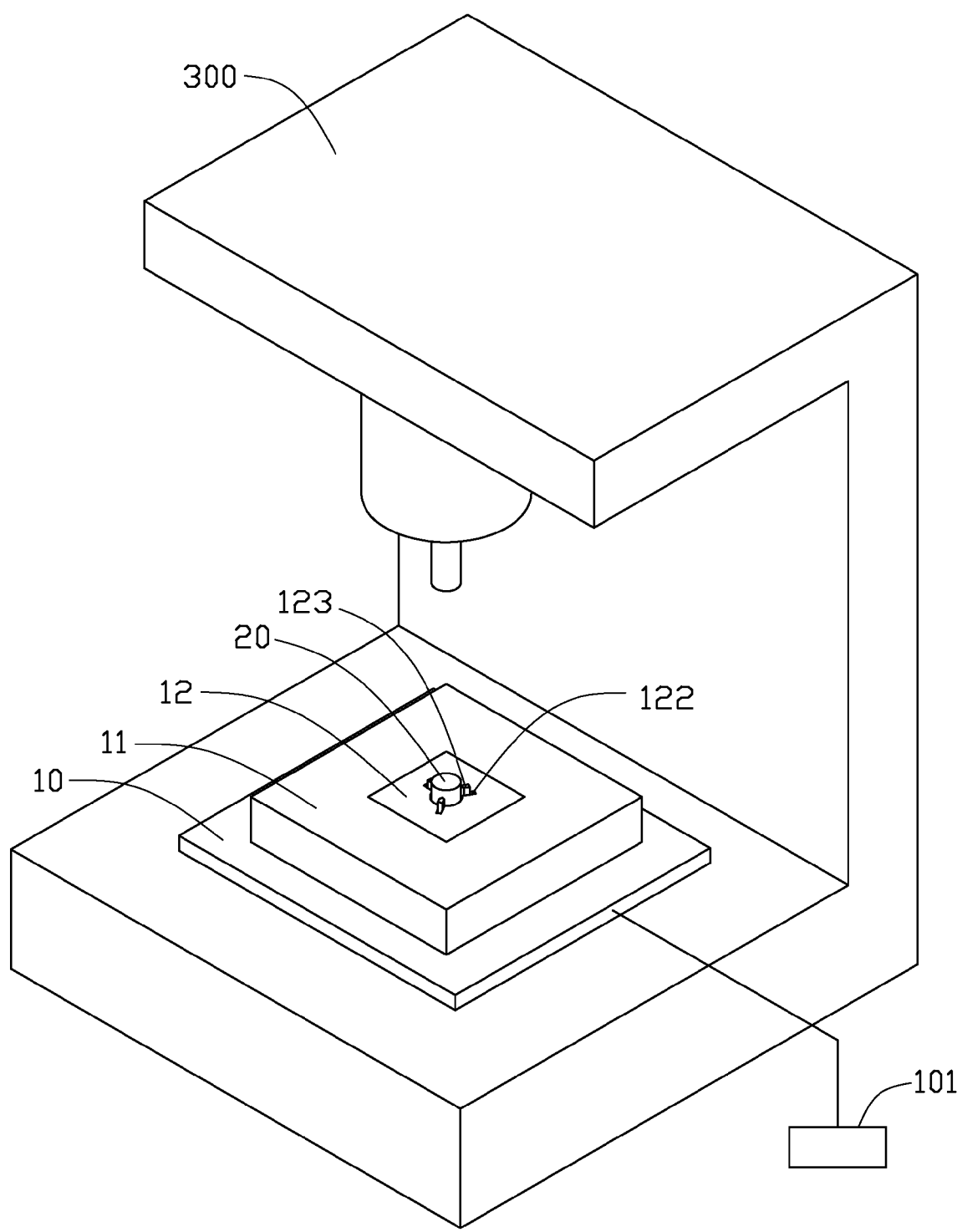
FIG. 3 is a schematic drawing showing the surface of the core being processed by a laser carving machine.
Figure 4:
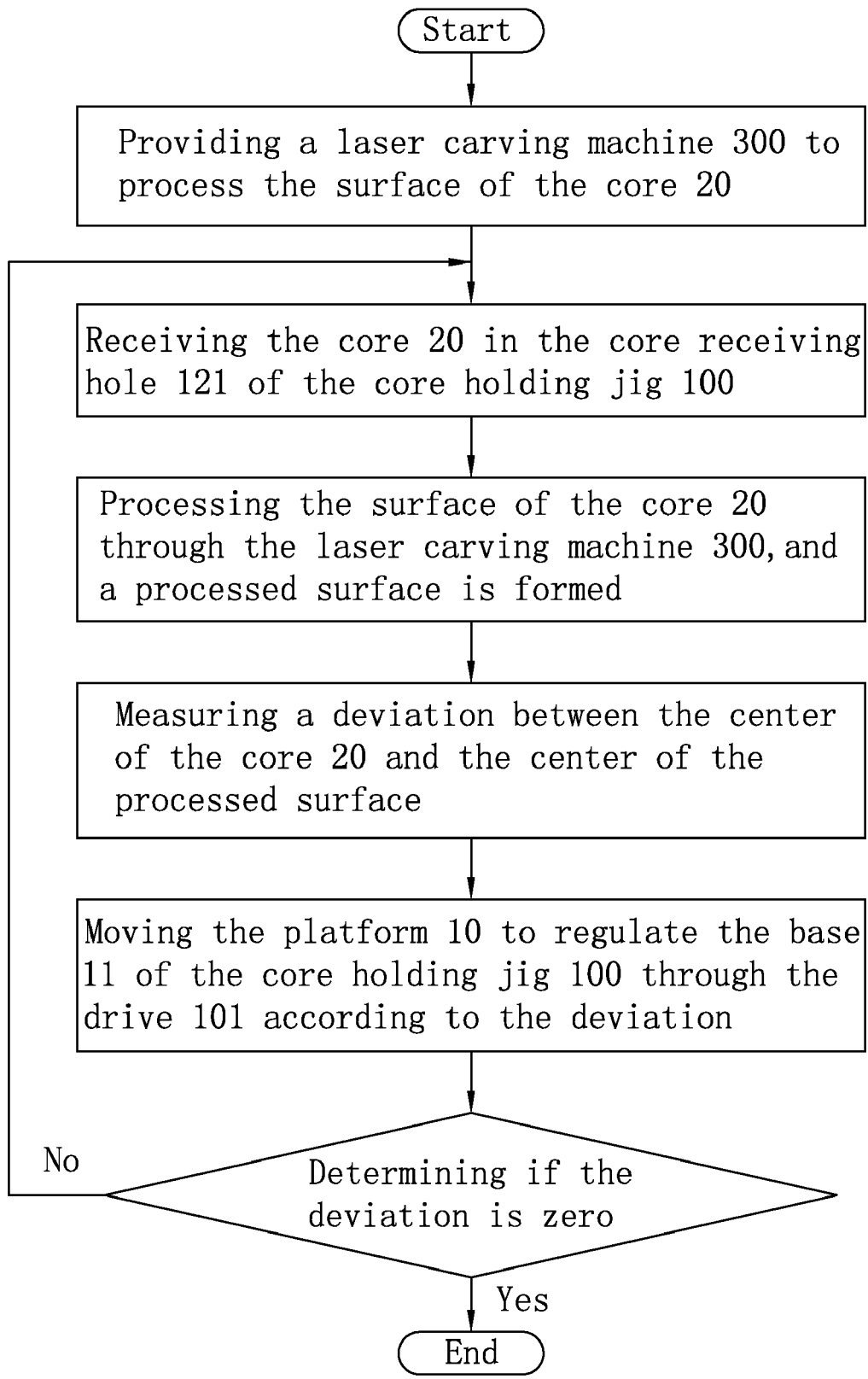
FIG. 4 is a flowchart of a method for aligning the center of the core with the laser carving machine to process the surface of the core.

FIG. 3 shows a laser carving machine 300 provided to process the surface of the core 20, which forms a light spot on the core 20. A very small etched area is formed on the core 20 to correspond to operational requirements. Accordingly, the center of the core 20 should align with a processing head 301 of the laser carving machine to process the light spot and the etched area precisely. The disclosure further provides a method for aligning the core 20 with the processing head 301 of the laser carving machine, as shown in FIG. 4.

In step S101, a laser carving machine 300 is provided to process the surface of the core 20. In step S102, the core 20 is received in the core receiving hole 121 of the core holding jig 100. In step S103, the surface of the core 20 is processed by the laser carving machine 300, to form a processed surface. In step S104, a deviation between the center of the core 20 and the center of the processed surface is measured. In step S105, according to the deviation, the platform 10 is moved to regulate the base 11 of the core holding jig 100 by the driver 101, and further to align the center of the core 20 with the processing head 301 of the laser carving machine 300. Steps S102 to S105 are repeated until the deviation is substantially eliminated.

The jig 100 disclosed by the embodiment of the present application ensures that the position of the core 20 remains unchanged during alignment of the center of the core 20 with the laser carving machine 300. Therefore, repeated regulation of the position of the core 20 and associated problems can be avoided, and operation time can be reduced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A jig for holding a core, comprising:
    a movable platform;
    a base, positioned on the movable platform, comprising a containing hole;
    an inserter positioned inside the containing hole of the base, the inserter corresponding in shape to that of the containing hole to firmly receive the core in the inserter;
    wherein the inserter comprises:
        a core receiving hole;
        a plurality of positioning recesses disposed symmetrically in the periphery of the core receiving hole;
        a plurality of positioning blocks received in the positioning recesses;
        and a plurality of resilient elements received in a space between the positioning recesses and the positioning blocks to help hold the core firmly;
        wherein the number of the positioning blocks correspond to the number of the positioning recesses, and the width of each positioning block is less than the width of the positioning recesses.

2. The jig for holding a core as claimed in claim 1, wherein the resilient element is a spring.

3. The jig for holding a core as claimed in claim 1, wherein the movable platform further comprises an electrical driver to drive the base in horizontal and vertical directions.

4. The jig for holding a core as claimed in claim 1, wherein the portion of each positioning block contacting the core is tapered.

5. The jig for holding a core as claimed in claim 1, wherein the receiving hole is triangular.

6. The jig for holding a core as claimed in claim 1, wherein the receiving hole is rectangular.

7. A method for aligning center of a core with a laser carving machine, comprising:
  (a) providing a jig to hold the core, which comprises a movable platform, a base, and an inserter, wherein the base is positioned on the movable platform and comprises a containing hole; the inserter positioned inside the containing hole of the base, the inserter corresponding in shape to that of the containing hole to firmly receive the core in the inserter; the inserter comprises a core receiving hole, a plurality of positioning recesses disposed symmetrically in the periphery of the core receiving hole, and a plurality of positioning blocks received in the positioning recesses;
  (b) providing a laser carving machine to process a surface of the core;
  (c) receiving the core in the core receiving hole of the core holding jig;
  (d) processing a surface of the core through the laser carving machine;
  (e) measuring a deviation between the center of the core and the center of the processed surface;
  (f) moving the platform to align the center of the core with the laser carving machine according to the measured deviation;
  repeating above steps:
  (d) said processing said surface of the core through the laser carving machine;
  (e) said measuring said deviation between the center of the core and the center of the processed surface;
  (f) said moving the platform to align the center of the core with the laser carving machine according to the measured deviation;
  until the deviation is substantially eliminated.

8. A jig for holding a core, comprising:
  a movable platform;
  a base, positioned on the movable platform, comprising a containing hole;
  an inserter positioned inside the containing hole of the base, the inserter corresponding in shape to that of the containing hole to firmly receive the core in the inserter;
  wherein the inserter comprises:
    a core receiving hole;
    a plurality of positioning recesses disposed symmetrically in the periphery of the core receiving hole;
    a plurality of positioning blocks received in the positioning recesses;
    and a plurality of resilient elements received in a space between the positioning recesses and the positioning blocks to help hold the core firmly.

9. The jig for holding a core as claimed in claim 8, wherein the resilient element is a spring.

10. The jig for holding a core as claimed in claim 8, wherein the movable platform further comprises an electrical driver to drive the base in horizontal and vertical directions.

11. The jig for holding a core as claimed in claim 8, wherein the portion of each positioning block contacting the core is tapered.

12. The jig for holding a core as claimed in claim 8, wherein the receiving hole is triangular.

13. The jig for holding a core as claimed in claim 8, wherein the receiving hole is rectangular.

14. The jig for holding a core as claimed in claim 8, wherein the number of the positioning blocks correspond to the number of the positioning recesses, and the width of each positioning block is less than the width of the positioning recesses.

* * * * *